UNITED STATES PATENT OFFICE.

CARLETON ELLIS, OF MONTCLAIR, NEW JERSEY.

CATALYZER AND PROCESS OF MAKING SAME.

1,088,673.  Specification of Letters Patent.  Patented Feb. 24, 1914.

No Drawing.  Application filed January 25, 1913.  Serial No. 744,157.

*To all whom it may concern:*

Be it known that I, CARLETON ELLIS, a citizen of the United States, and a resident of Montclair, in the county of Essex and State of New Jersey, have invented certain new and useful Improvements in Catalyzers and Process of Making Same, of which the following is a specification.

This invention relates to catalyzers adapted for various purposes and in particular for the transference of hydrogen to unsaturated oils such as fatty oils, to saturate, more or less, and thus convert oleins into stearins and so forth; and my invention relates especially to porous bodies including active charcoal or similar carbonaceous material, exteriorly but not interiorly, coated or impregnated with metallic catalysts preferably having coöperative properties, and to the process of making same as will be hereinafter described.

The catalytic properties of charcoal are well known, the occlusive action of charcoal for oxygen and hydrogen being in some respects analogous to palladium. (*J. S. C. I.*, 1902, 311.) Charcoal also has been suggested as a hydrogen carrier or hydrogenating catalyst for the conversion of chlorin into hydrochloric acid (Pataky, Eng. Pat. 1831, 1900.) Likewise the use of nickel as a hydrogenating medium or carrier has been long known through the researches of Sabatier and Senderens, Ipatieff and others.

The present invention does not involve the use of these well known catalyzers singly, but, in the preferred form of the invention, involves their use in combination, and in a certain manner as will be hereinafter set forth. Neither ordinary charcoal nor nickel alone are entirely or generally satisfactory as catalysts for the hydrogenation of oils. In combination in a certain manner they exert coöperative effects of great value. If the charcoal and nickel body can be maintained in close contact without permitting the pores of the charcoal to be clogged by the nickel body, then a mutuality of catalytic action is secured which enables oils to be rapidly hydrogenated without the occurrence of undesirable side reactions.

To secure intimate contact without pore-clogging, I may precipitate, on but not in, the charcoal, which by the way is finely divided, a quantity of nickel hydrate or similar reducible nickel compound or other equivalent body, as cobalt. etc. and adjust the proportion of the nickel compound with respect to the bulk and porosity of the charcoal so as to coat the charcoal only partially, leaving the pores open sufficiently as to secure free "breathing" of the charcoal in the atmosphere of hydrogen to which it is to be subjected.

The charcoal employed should be carefully selected. Cocoanut charcoal is desirable as well as many of the hard wood charcoals. It is also desirable, for best results, to have a charcoal which has been carbonized at a low temperature. Many of the charcoals of commerce have been so highly heated during carbonization that a very slight (visually) almost imperceptible coking or graphitization of an undesirable character has been effected, sometimes rendering the charcoal entirely or partially ineffective for the purpose herein. Carbonization preferably should be carried to a point where all undesirable volatile and toxic matters of an organic character are eliminated by the heat, and yet the temperature preferably should be held throughout the carbonization period below the point of incipient coking or virtual graphitization. Again lime compounds reactive with oils preferably should be eliminated, as well as sodium chlorid. This may be effected by washing the powdered charcoal with hot dilute nitric acid and afterward with water. The charcoal is then ready to be mixed with the precipitating agent. For this purpose I may use caustic soda which with, for example, nickel sulfate, forms nickel hydrate and sodium sulfate. About 15% of metallic nickel based on the weight of the charcoal is a desirable proportion to treat the charcoal with, without pore-clogging. Accordingly quantities of nickel sulfate and caustic soda sufficient for the proportion indicated are taken; but, as stated above, adjustment of the proportion of the nickel compound should be made with respect to the bulk and porosity of the finely-divided charcoal so as to effect but a partial deposition of the finely-divided material in order to leave the pores open to an extent sufficient to secure the free "breathing" aforementioned. The caustic soda is, for instance, dissolved in a small amount of water and the charcoal impregnated with this solution. The nickel sulfate is likewise dissolved in water and added to the charcoal impregnated with the caustic soda. On coming in contact with the latter the nickel precipitates as the hydrated oxid and its deposition is substantially at or near the surface because of these peculiar conditions of precipitation thus established. The composition may be dried, reduced in hydrogen and used for treatment of oils, or if desired the sulfate of sodium present in this duplex catalyzer may be removed by washing. After washing, the composition is dried and reduced in a reducing atmosphere sufficient to expel all the occluded gases of a detrimental character.

The reduced product carries a very heavy charge of hydrogen apparently, and this enables the product to be kept in oil for days or weeks, with the oil exposed to air. On the other hand the product is very often pyrophoric and fires in the air more quickly than pyrophoric nickel, so far as my observations go.

While often thus extremely pyrophoric this type of duplex catalyzer apparently is not as sensitive to poisons as metallic catalyzers of the usual type. Charcoal itself has the great advantage over the various metals as palladium and the like of being immune to some toxic bodies which poison the metals themselves.

A properly made catalyzer is very economical in use, a smaller proportion of catalyzer being required to rapidly hydrogenate even rather resistant oils, than is customary with for example, ordinary nickel catalyzers, such as the nickel on pumice or other inert material as proposed by Sabatier and Senderens, referred to above.

To recapitulate, my invention comprises as a catalyzer, granular or finely-divided material preferably well-carbonized but uncoked charcoal or other carbonaceous material of equivalent properties capable of occluding hydrogen, etc., which charcoal and the like is essentially or substantially free from certain bodies toxic to metal catalyzers especially nickel and cobalt catalytic compounds, and also is preferably free from free lime or lime reactive with fatty oils to form like soaps of a clogging nature; said charcoal and the like having its surface or surface rugosities more or less coated, tipped or flecked with a metallic catalyzer or chemically different catalyzer preferably of metallic nickel preferably carried in such a manner as to leave a substantial part of the pores of the charcoal mass or granule open and permeable with great ease by hydrogen gas, and preferably in such a manner that the said granule or particle is interiorly substantially free of nickel or other metallic bodies or pore-clogging salts.

I do not wish to limit myself by the foregoing description to the precise materials illustratively used but may invoke the doctrine of equivalency in so far as same may be herein applicable. For example, nickel oxid may be used as a catalytic coating in lieu of metallic nickel.

What I claim is;—

1. The process of making catalytic bodies which comprises interiorly incorporating in the pores of a granular material a solution of a precipitant and in subsequently admixing with said material a solution of a metallic salt precipitable by said precipitant; whereby a coating of an insoluble body on said material is secured.

2. The process of making catalytic bodies which comprises interiorly incorporating in the granules of a charcoal substance a precipitant of nickel and in subsequently admixing therewith a solution of a nickel salt.

3. The process of making catalytic bodies which comprises interiorly incorporating in the particles of a finely-divided pulverulent but porous material, a precipitant of nickel and in subsequently admixing therewith a solution of a nickel salt.

4. The process of making catalytic bodies which comprises interiorly incorporating in the particles of a finely-divided pulverulent but porous material, a precipitant for a metal and in subsequently admixing therewith a solution of a metallic salt capable of forming a precipitate with said precipitant.

5. A catalyzer comprising finely-divided carbonaceous matter capable of occluding hydrogen, having not exceeding 15% of nickel material distributed over the particles thereof.

6. A catalyzer comprising finely-divided carbonaceous matter capable of occluding hydrogen carrying not exceeding 15% of nickel material.

7. A catalyzer comprising finely-divided carbonaceous matter capable of occluding hydrogen, carrying not exceeding 15% of nickel material in the form of fine particles in contact with said carbonaceous matter.

8. A catalyzer comprising finely-divided porous material capable of occluding hydrogen carrying not exceeding 15% of nickel material in the form of fine particles in contact with said porous material; whereby the pores of said porous matter are maintained in an open and substantially unobstructed condition.

9. A catalyzer comprising finely-divided charcoal substantially free from bodies toxic to metal catalyzers, said charcoal carrying on its surface rugosities a less than pore-plugging quantity of a metal catalyst but being interiorly substantially free therefrom; said catalyzer carrying not exceeding 15% of metallic material.

10. A catalyzer comprising finely-divided carbonaceous matter capable of occluding hydrogen, said matter being substantially free from bodies toxic to metal catalyzers, and said matter carrying on its surface rugosities a substantially less than pore-plugging quantity of a metal catalyst but being interiorly substantially free therefrom; said catalyzer carrying not exceeding 15% of metallic material.

11. As a catalyzer finely-divided charcoal carrying reduced nickel on some of its surface rugosities but being substantially free interiorly of nickel bodies; said catalyzer carrying not exceeding 15% of nickel material.

12. As a catalyzer, finely-divided pulverulent porous material carrying reduced nickel on some of the surface rugosities of its particles but said particles being substantially free interiorly of nickel bodies; said catalyzer carrying not exceeding 15% of nickel material.

Signed at Montclair in the county of Essex and State of New Jersey this 11th day of January A. D. 1913.

CARLETON ELLIS.

Witnesses:
B. M. ELLIS,
I. DAVID LUBETZKI.